Dec. 31, 1929. D. L. PRATT 1,741,335
DETERMINATION OF FIGURE TYPES

Filed Dec. 29, 1928

Inventor
Della Lytton Pratt
By B. Singer, Atty.

Patented Dec. 31, 1929

1,741,335

UNITED STATES PATENT OFFICE

DELLA LYTTON PRATT, OF LINDFIELD, NEAR SYDNEY, NEW SOUTH WALES, AUSTRALIA

DETERMINATION OF FIGURE TYPES

Application filed December 29, 1928, Serial No. 329,227, and in Australia May 21, 1928.

This invention relates to improvements in the determination of figure types, and has been devised as a means of classifying the human female figure into certain definite classes. The invention is particularly adapted for use by corsetières, when selecting a type of corset, after having taken the measurement of the person desiring to be fitted.

An object of the present invention is to devise means whereby the respective measurements of the human figure may be combined in scales or charts in such manner that two of the measurements form a basis for selection while a third measurement used in conjunction with the other two measurements determines the figure type and therefore the type of garment suitable for a person whose figure corresponds to the measurements in question.

A further object is to devise means whereby, when the hip and waist measurements are taken as a basis, in determining the type of garment best suited to a person desiring to be fitted, the bust measurement is taken as a correction to the combined hip and waist measurements.

It has been found as the result of research and by measuring some thousands of living persons, that there is a definite ratio of proportion between certain of the measurements of the persons measured.

Investigation showed that of the measurements taken the hip and waist were more often related than any other two measurements, and for this reason the measurements of the hip and waist are taken as a basis for the device forming the subject of the present invention; but it should be understood that I do not limit myself to the measurements at these two positions as the basis.

The research indicated that, in determining the figure types although two measurements would be sufficient to approximately determine the type, a third measurement is necessary as a correction, in order to select a more perfectly fitting garment.

According to one form of the invention, measurements of the hips and waist of women taken either by tape or calipers, are used as a basis for selection in combination with the measurements of their bust.

In a preferred construction the device consists of a base having a circular opening within which a rotatable disc is visible. The circumference of the disc and the edge of the circular opening in the base are graduated with markings corresponding respectively to bust and hip measurements of women. A third scale bearing their waist measurements is pivoted beneath the base and is disposed so as to intersect the graduations or markings on the disc, and edge of the circular opening in the base. In addition to the above features, this form of the invention contemplates the placing, upon the surface of the disc, of information relative to the various types of figures. For instance, this information may be conveyed by means of geometric or other shaped areas of various colours.

But in order that the invention may be more readily understood, reference will now be made to the accompanying drawings wherein:—

Figure 1:
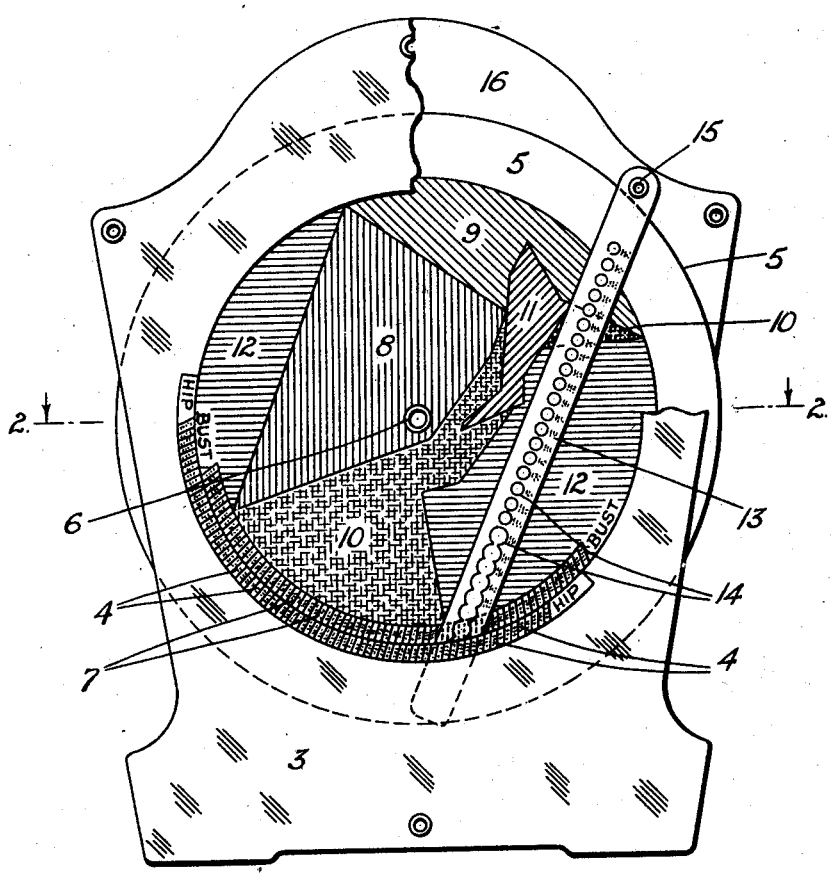
Figure 1 is a plan view with portion of the base removed showing the backing, the disc, and the means for pivoting the third scale.
Figure 2:
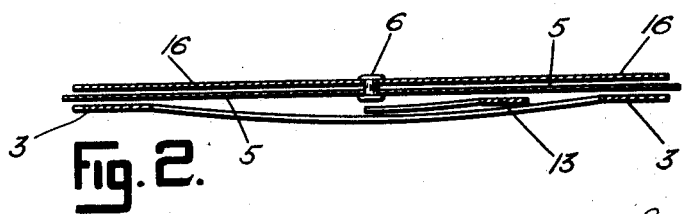
Figure 2 is a sectional view on the line 2—2 of Figure 1 showing the base, the third scale, the disc, and the backing.

In the device illustrated the base 3 has a circular opening on the edge of which is disposed a number of spaces 4 all of equal width. These spaces 4 contain numerals representing the linear measurements around the hips of women and may range from 28 inches to 60½ inches advancing by one ½ inch at a time from the right to left of Figure 1.

Beneath the base 3 a disc 5 is mounted on an eyelet 6 or the like. The surface of the disc 5 adjacent to the circular opening in the base 3 is provided with a number of spaces 7. These spaces contain numerals representing the linear measurements round the bust of women and may range from 28 inches to 60½ inches advancing by one ½ inch at a time from right to left of Figure 1. In addition to the bust measurements the disc 5 has placed thereon several geometric forms which may be coloured to indicate various figure types such as "big hip" 8 "sway back" 9, "big abdomen" 10, "average" 11, and "short below waist" 12.

A scale 13 is provided bearing the waist measurements of women. This scale is preferably of celluloid or transparent material and has circles 14 disposed adjacent to the measurements. In some cases the scale may be made of opaque material having orifices in place of the circles 14.

The areas represented by the numerals 8, 9, 10, 11, 12, will vary according to the figure types selected as a standard. In the present example the boundaries of the said areas were plotted from known measurements taken from a considerable number of human figures collected under the above five types.

In operating the device, to select a garment type for a person desiring to be fitted with a garment and whose measurements at the bust, waist, and hips are assumed to be 35 inches, 28 inches, and 37 inches respectively, the numeral 35 on the bust chart or scale is brought into line with the numeral 37 on the hip chart or scale by rotating the disc 5 until the two measurements coincide. The third scale 13 bearing the waist measurements is then moved so that one of the circles 14 or orifices at its lower end intersects the above two measurements, whereupon the scale 13 will indicate at the 28 inch orifice that for this particular person a garment of "average type" is most suitable for her figure.

I claim:

1. A device for determining the figure type of a person desiring to be fitted with a corset or like garment, consisting of the combination of means whereby the respective measurements round the bust, hips and waist of women are used in arriving at the determination, said means comprising a scale or chart bearing progressively the measurements of the bust of women, a second scale or chart bearing progressively the measurements of the hips of women said second scale being used as a basis for selection for the type of garment, and a third scale or chart bearing progressively the measurements of the waist of women, said third scale serving as a final adjustment to the determination of the type selected by the said bust and the hip scales or charts.

2. A device for determining the figure type of a person desiring to be fitted with a corset or like garment comprising a movable circular chart or scale bearing a plurality of geometric forms indicative of figure types of women and divided circumferentially into spaces in which are progressively placed the measurements in inches around the bust of women, a chart or scale concentric therewith and divided into spaces in which are progressively placed the measurements in inches round the hips of women, and a pivoted scale divided by means of circles or orifices into spaces against which the measurements in inches round the waist of women is progressively placed, said last mentioned scale being adapted to intersect said concentric charts or scales when manually operated.

3. A device for determining the figure type of a woman desiring to be fitted with a corset or like garment, comprising a base having a circular opening on the edge of which is disposed a number of spaces containing the measurements round the hips of women, a disc pivoted concentrically with respect to said base, said disc being provided adjacent to the opening in the base with a number of spaces containing the measurements round the bust of women, said disc being also provided on its surface with a number of geometric forms indicative of figure types of women, determined by statistics, an elongated scale member provided with orifices throughout its length and having placed thereon numerals corresponding to measurements round the waist of women, and a backing member between which and the base the said disc and elongated scale member are disposed, said elongated scale member and disc being pivoted to the said backing.

In testimony whereof I have hereunto set my hand.

DELLA LYTTON PRATT.